Figures 1, 2:
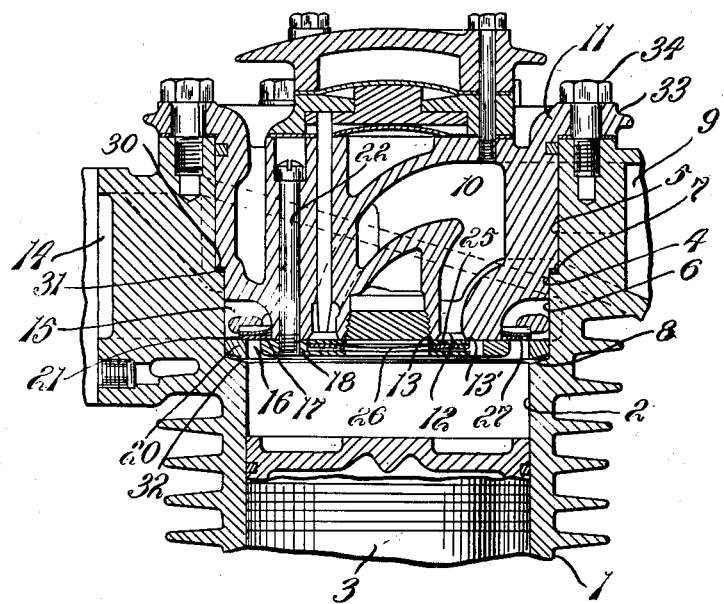

June 13, 1939.  W. W. PAGET  2,161,833
SEALING DEVICE
Filed Jan. 5, 1937

Inventor:
Wm W. Paget
By Louis A. _____
Atty.

Patented June 13, 1939

2,161,833

UNITED STATES PATENT OFFICE 2,161,833

SEALING DEVICE

Win W. Paget, Michigan City, Ind., assignor to Sullivan Machinery Company, a corporation of Massachusetts Application January 5, 1937, Serial No. 119,126

7 Claims. (Cl. 285—163)

My invention relates, from one aspect, to sealing devices, and from another aspect, to pumping apparatus having improved sealing devices incorporated therein.

In making joints, as, for example, in making joints in pumping mechanisms between the head of a compressor cylinder and a multi-shouldered bore formed in the compressor cylinder, some difficulty is experienced in effecting adequate sealing and preventing the leakage of pressure between spaces within the compressor wherein different pressures prevail, as, for example, from discharge to inlet spaces and the like. Moreover, for example, where there is employed a valve mechanism including a seat element supported adjacent the end of the cylinder bore proper and other relatively movable parts, it is important to provide adequate sealing between the valve seat and the cylinder walls, and this problem may be complicated by the necessity for sealed seating at other points nearer the outer end of the cylinder. Similar problems come up in other places, as, for example, in connection with closures for containers and the like; and it is an object of my invention to provide an improved seal between relatively movable parts which are to be clamped together. It is another object of my invention to provide an improved seal for use in air compressors, pumps and the like, precluding leakage between valve mechanism elements and cylinder elements or the like. It is a further object of my invention to provide an improved seal capable of a certain amount of deflection when in use, thereby providing for very effective sealing. Other objects and advantages of my invention will hereinafter more fully appear.

In the accompanying drawing, in which, for purposes of illustration, the invention is shown incorporated in an air compressor—

Fig. 1 is a sectional view through the head end of an air compressor cylinder; and Fig. 2 is a fragmentary view, on a somewhat enlarged scale, showing a detail of construction.

Referring to the drawing, it will be noted that a cylinder 1, having a bore 2 in which a piston 3 is reciprocable, has an enlarged alined stepped bore 4 in its upper end to receive the cylinder head and valve elements of the compressor. Said bore 4 is provided with an outer portion of maximum internal dimension, 5, an adjacent portion of smaller internal dimension, 6, with a shoulder 7 between these bores; and a wider shoulder 8 extends between the cylinder bore 2 and the lower end of the bore 6. The cylinder member comprises an intake passage 9 communicating with an intake space 10 formed in the cylinder head 11, the latter space extending into communication with an annular groove 12 surrounded by coaxial annular valve seat surfaces 13 and 13'. A discharge passage 14 leads from the cylinder element proper and communicates with a suitable discharge passage 15 in the head 11, and this passage communicates with an annular discharge valve opening 16, to whose inner side lies a valve seat 17 formed on a head-mounted element 18, while an outer surrounding seat surface 21 is made on a ring or annulus 20 mounted adjacent the shoulder 8. The element 18 is fixed, as by screws 22, to the face of the cylinder head member and provides a guard for an inlet valve 25 which coacts with the coaxial valve seats 13 and 13' and is normally held in position by an annular spring 26. A discharge valve element 27 coacts with the coaxial seat surface 21 on the ring element and the seat 17 on the member 18. The head 11 has a shoulder 30 adapted to coact with the shoulder 7 either directly or through a suitable gasket; and the lower end of the head member has provision for pressing upon the ring 20 to force the same towards the seat 8. As it is obvious that it is impossible to have more than one pair of longitudinally spaced coaxial surfaces maintain tight seals at a given time with any assurance, a gasket 31 is desirably employed at the shoulder 7, and improved packing or sealing means is arranged at 32 adjacent the seat 8. The head has a peripheral flange 33 by means of which bolts 34 clamp the head in position.

It has been pointed out that the lower end of the head presses upon the top of the ring member 20 and forces it towards the seat 8. A certain amount of clearance is provided adjacent the improved packing means previously mentioned, in order to provide a seal and yet insure sealing at the shoulder 7. It will be noted that the ring 20 is provided with an inner side comprising a sloping, frusto-conical, downwardly facing shoulder 35, a flattened surface 36 at the forward end of the sloping surface 35, and a narrow, forward, cylindrical-walled projecting rim 37. The shoulder 8 is provided with an outer horizontal plane annular surface 39, to the inside of which lies a sloping frusto-conical surface 40. A resilient gasket element 41, made of suitable metal, for example, may be supported at its outer lower surface on the surface 39, while the inner portion of its upper surface is engaged by the surface 36, as at 42. The sloping surfaces heretofore described provide a certain clearance enabling downward crowding of the inner rim of the ring member towards the lower end of the cylinder, and upon the application of pressure to this ring member a tightly sealed joint is made between the lower side of the gasket member 41 and the surface 39, and a tight seal is also made at 42 with the surface 36, the deformability of the ring or gasket 41 permitting a tight and positive seal to be made at these points. It will therefore be evident that by providing a little less distance between the planes including the surfaces 36 and 39 than would be necessary for the gasket to remain plane when a proper joint is made at the shoulder 7, a tight seal can be insured between the shoulder generally designated 8 and the valve seat ring, under all circumstances. An additional peripheral packing ring can be provided at the upper end of the head member, near the lower side of the annular flange 33, if desired. Of course, the head 11 will have its portions engaging the top of the ring 20 in the same plane with the seat 17.

From the foregoing description it will be clear that I have provided improved sealing means, both of general application and particularly adapted to making seals in compressors or pumps or the like, and that I have provided an improved sealed compressor construction. Many of the details of the specific valve mechanism are the invention of one R. E. Lamberton and are the subject of a separate application by him, Serial No. 140,030. I therefore claim no such features except in the combinations set forth.

While I have in this application specifically described one form which my invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In combination, a plurality of members arranged in coaxial relation and held against relative axial movement, coaxial annular plane surfaces on said members having different diameters, and means for sealing off passage of fluid through the space between said members including an annular initially plane gasket frusto-conically deformed between said plane surfaces on clamping of said members, by relative axial movement thereof, against the opposite initially plane surfaces of said gasket.

2. In combination, a compressor cylinder providing stepped bores, an element having portions fitting a plurality of said bores and having a shoulder to coact with a shoulder on said cylinder, said cylinder providing another shoulder more inwardly disposed, an element adapted to be pressed by said first mentioned element towards said last mentioned shoulder, and means for providing a seal between said last mentioned element and said last mentioned shoulder including a plane annular resilient gasket or sealing element deformed out of its plane on the establishment of sealing relation at the first mentioned pair of shoulders.

3. In combination, a member providing an annular shoulder comprising a plane outer annular surface and a frusto-conical inner portion, a cooperating member providing an outer frusto-conical surface having to its inside a plane annular surface parallel to said first mentioned annular surface, a stiff resilient annular plane gasket contacting said annular plane surfaces, and means for moving said members together to deform said gasket out of a plane between said annular plane surfaces for sealing off fluid flow therebetween.

4. In combination, a compressor cylinder having a shoulder near the upper end of its bore and a shouldered enlarged bore outwardly of said shoulder, a valve seat ring adjacent said shoulder, said ring having a plane annular valve seat surface, a head adapted to enter said enlarged bore and shouldered to coact with a shoulder in the larger bore, a valve seat element having a plane annular valve seat surface and carried by said head, means on said head engaging said ring to position the valve seat surface on said ring in a common plane with the valve seat surface on said valve seat element, and a gasket deformed out of a plane and engaging said first mentioned shoulder towards its outermost portion and said ring near its inner edge for resiliently sealingly engaging said parts when the latter are in desired relation.

5. In combination, a member providing an annular shoulder comprising a plane outer annular surface and a frusto-conical inner surface, a cooperating member providing an outer frusto-conical surface having to its inside a plane annular surface parallel to said first mentioned plane surface, a stiff, resilient, normally plane, annular gasket contacting said plane annular surfaces, and means for holding said members in a relative position in which the planes of said annular plane surfaces are closer to each other than the thickness of said gasket and contact with the opposite sides of said gasket respectively, frusto-conically deforming said gasket.

6. In combination, a pair of cooperating relatively movable coaxial members, and means providing a seal between said members comprising a plane annular sealing element interposed between and contacted by said members at radially offset points and deformed out of its plane into sealing relation with said members when said members are relatively moved into cooperating relation.

7. In combination, a plurality of members arranged in coaxial relation, coaxial annular plane surfaces on said members, one of said annular plane surfaces having an inner diameter exceeding the outer diameter of said other annular plane surface, clamping means for said members, and means for sealing off passage of fluid between said members including an annular plane gasket contacting said plane surfaces and frusto-conically deformed between said members on clamping thereof.

WIN W. PAGET.